Aug. 5, 1969  F. W. FORK  3,459,875
METAL CELLULAR SECTION
Filed March 24, 1967  2 Sheets-Sheet 1

INVENTOR.
FRANK W. FORK
BY
George E. Manias
AGENT

Aug. 5, 1969  F. W. FORK  3,459,875
METAL CELLULAR SECTION
Filed March 24, 1967  2 Sheets-Sheet 2

INVENTOR.
FRANK W. FORK
BY
George E. Manina
AGENT

United States Patent Office 3,459,875
Patented Aug. 5, 1969

3,459,875
METAL CELLULAR SECTION
Frank William Fork, Allison Park, Pa., assignor to H. H. Robertson Company, Pittsburgh, Pa., a corporation of Pennsylvania
Filed Mar. 24, 1967, Ser. No. 630,783
Int. Cl. H02g 3/28, 3/04; B23p 19/04
U.S. Cl. 174—97                                    12 Claims

ABSTRACT OF THE DISCLOSURE

A metal cellular section having plural spaced parallel cells adapted for use as electrical raceways for different electrical services including, for example, power, telephone and signal services. In accordance with the present invention, the metal cellular section includes preformed conduit means providing communication between the interiors of selected adjacent cells whereby availability to three types of electrical service is provided at a single access location in the metal cellular section.

BACKGROUND OF THE INVENTION

Field of the invention

This invention relates to metal cellular sections of the type having a plurality of cells serving as electrical raceways for different electrical services, and more particularly to improved metal cellular sections of the type described having preformed conduit means providing communication between two adjacent cells of said metal cellular section.

Description of the prior art

Metal cellular sections, also known as metal raceway sections, normally comprise an upper corrugated sheet having crests and valleys and inclined side walls connecting adjacent ones of the crests and valleys, and a lower metal sheet secured thereto and cooperating with the crests and the inclined side walls thereof to form a plurality of spaced, generally parallel enclosed cells or raceways. The metal cellular sections are embedded in a slab-type concrete floor construction and normally serve only as electrical raceways. The enclosed raceways remain available throughout the life of the building as passageways for electrical wiring.

Heretofore, access to the electrical raceways beneath the concrete has been gained by penetrating the concrete and the sheet metal crest of a particular cell to introduce or withdraw electrical cables. Many electrical codes have required that the power conductors be maintained in a separate cell apart from the low voltage wiring. It is also desirable to maintain the low voltage telephone wiring in a separate cell apart from the low voltage signal and communication wiring. Hence, it has been necessary to provide a first floor outlet for power utilization, a second floor outlet for telephone installation, and still a third floor outlet for the signal equipment.

In my earlier-filed copending application Ser. No. 535,282, filed Feb. 14, 1966, now U.S. Patent 3,417,191 which is assigned to the assignee of the present invention, I have described a novel electrical distribution system wherein a single access opening is provided between a pair of underfloor cells to allow a single floor outlet to accommodate two types of electrical service which are required by electrical codes to be delivered separately to the point of access.

In my earlier-filed copending application Ser. No. 587,509, filed Oct. 18, 1966, which is assigned to assignee of the present invention, I have described an improved metal cellular section wherein two openings are provided in an adjacent pair of underfloor cells to allow installation of the single floor outlet of the aforesaid copending application Ser. No. 535,282 now U.S. Patent 3,417,191, in the metal cellular section.

SUMMARY OF THE INVENTION

The principal object of the present invention is to provide a metal raceway section having plural cells and provided factory installed conduit means extending between adjacent cells to provide communication between said adjacent cells.

Another object of this invention is to provide a metal raceway section having factory installed means to accommodate availability of three types of electrical service at a single access location in the metal raceway section.

Another object of the invention is to provide factory installed means in a metal raceway section, which means serves to convey wiring from a remote cell to a single access location in the metal raceway section without disturbing the wiring in the adjacent cells and while conforming to existing electrical codes.

Still another object of the invention is to provide a metal raceway section having factory installed means at a plurality of locations along the length of said section to accommodate availability of three types of electrical service at each of said locations.

The present invention provides improvements in a metal cellular section of the type providing at least an intermediate and first and second lateral cells, and wherein each pair of adjacent cells presents spaced crests, confronting generally vertical side walls and an intermediate valley disposed between the confronting side walls. The metal cellular section includes access means providing communication to the interior of at least the intermediate cell.

In accordance with one embodiment of the present invention, the access means provides communication simultaneously to the interiors of the intermediate cell and the first lateral cell. The metal cellular section includes conduit means providing communication between the interiors of the intermediate and second lateral cells. In the preferred arrangement, a pair of the conduit means is provided for each access means. The conduit means extend diagonally between the intermediate and second lateral cells and diverse from each other. The arrangement is such that wiring may be introduced through one conduit means into the second lateral cell wherein the wiring proceeds through the cell in one direction in the metal cellular section; and such that wiring may also be introduced through the other conduit means into the second lateral cell wherein the wiring proceeds through the cell in the opposite direction in the metal cellular section.

In accordance with an alternative embodiment of the present invention, the access means provides communication solely into the interior of the intermediate cell. The metal cellular section includes first conduit means providing communication between the interiors of the intermediate and first lateral cells and second conduit means providing communication between the interiors of the intermediate and second lateral cells.

In accordance with the present method of making the metal cellular sections, the conduit means may be provided by forming a convex indentation in a valley of the corrugated upper metal sheet. The convex indentation is formed after the upper metal sheet is corrugated. Alternatively, the conduit means may be provided by forming a concave indentation in the lower metal sheet, which terminates at locations interiorly of a subsequently formed pair of the cells.

DESCRIPTION OF THE DRAWINGS

The above and other objects and advantages of the present invention will become apparent from the following detailed description by reference to the accompanying drawings, in which.

DESCRIPTION OF THE PREFERRED EMBODIMENTS

Figure 1:
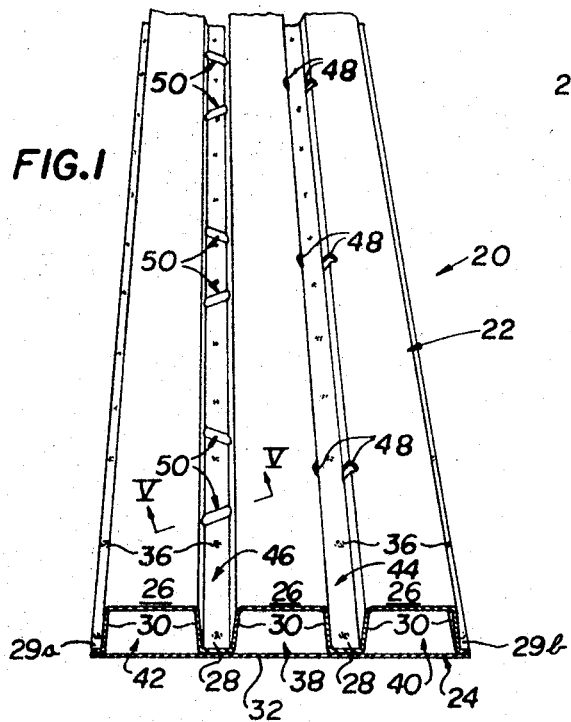
FIGURE 1 is an isometric view of a metal cellular flooring section formed in accordance with the present invention.

Raceway section.—Referring now to FIGURE 1, there is illustrated a metal raceway section 20 including an upper metal sheet 22 and a lower metal sheet 24.

The upper metal sheet 22 is corrugated and includes crests 26, valleys 28, generally vertical side walls 30 which connect adjacent ones of the crests 26 and valleys 28, and side valleys 29a and 29b.

The lower metal sheet 24 comprises a flat rectangular web 32 which is secured to the valleys 28, 29a, 29b preferably by means of a plurality of spot welds 36. The lower metal sheet 24 cooperates with the crests 26 and the generally vertical side walls 30 to form at least three spaced, generally parallel enclosed cells which will hereinafter be identified as an intermediate cell 38 and first and second lateral cells 40, 42 positioned on the opposite sides of the intermediate cell 38.

It will be noted that each pair of adjacent cells 38, 40 and 38, 42 presents spaced crests 26, confronting side walls 30 and an intermediate valley 28. Furthermore, the confronting side walls 30 and the intermediate valley 28 of each pair of adjacent cells 38, 40 and 38, 42 define a trough-like space 44 and 46, respectively.

Pairs of opposed openings 48 are provided at spaced locations along the length of the metal raceway section 20. The opposed openings 48 are formed in the confronting side walls 30 of the adjacent cells 38, 40. The overall arrangement is such that each pair of opposed openings 48 provides simultaneous communication between the two adjacent cells 38, 40 and the intervening space 44 at one access location in the metal raceway section 20.

Present improvement.—In accordance with the present invention, the metal raceway section 20 includes conduit means 50 providing communication between the interiors of the intermediate cell 38 and the second lateral cell 42. The conduit means 50 reside below the crests 26 and extend through the confronting side walls 30 of the intermediate cell 38 and second lateral cell 42.

The vast improvement brought about by incorporating the present conduit means 50 in the metal raceway section 20 can best be described with reference to FIGURES 2 and 3 which illustrate alternative arrangements. Corresponding numerals will be employed to identify corresponding parts heretofore described.

As explained above, many electrical codes require the power conductors to be maintained in a separate cell apart from the low voltage signal, communications and telephone wiring. On the other hand, the telephone companies have likewise required that their telephone wiring be maintained in a separate cell apart from the low voltage signal wiring.

Figure 2:
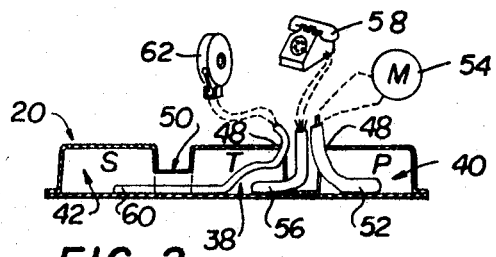
FIGURE 2 is a schematic cross-sectional view of the present flooring section illustrating the availability of three types of electrical service at a single access location.

As shown in FIGURE 2, the first lateral cell 40, labeled P, carries a power conductor 52 which extends through one of the openings 48 and is shown connected to a load, such as a motor schematically illustrated at 54.

The intermediate cell 38, labeled T, carries telephone wiring 56 which extends through the other of the openings 48 and is connected to a telephone schematically illustrated at 58.

The second lateral cell 42, labeled S, serves to convey signal wiring 60 for operating fire alarms, burglar alarms and the like. The signal wiring 60 extends through the conduit means 50 into the intermediate cell 38, out through the opening 48 and is connected, for example, to an alarm schematically illustrated at 62.

Figure 3:
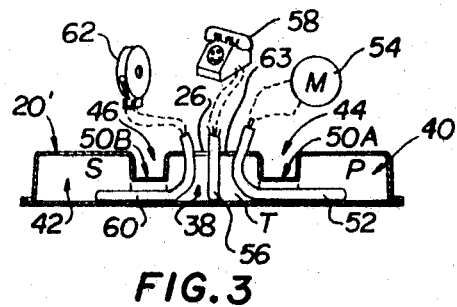
FIGURE 3 is a cross-sectional view, similar to FIGURE 2, illustrating an alternative arrangement wherein the availability of three types of electrical service is at a different single access location in the flooring section.

Reference is now directed to FIGURE 3 which illustrates an alternative arrangement wherein access to the three types of electrical services is available at a single but different access location. In this arrangement, a metal raceway section 20' has an opening 63 in the crest 26 of the intermediate cell 38; first conduit means 50A extending from the first lateral cell 40 through the trough-like space 44 to the intermediate cell 38; and second conduit means 50B extending from the second lateral cell 42 through the trough-like space 46 to the intermediate cell 38.

In this arrangement, the power conductor 52 and the signal conductor 60 enter the intermediate cell 38 and proceed through the opening 63 for connection, for example, to the motor 54 and the alarm 62. The telephone conductor 56 likewise extends through the opening 63 for connection to the telephone 58.

It should be readily apparent that in the metal raceway sections 20, 20' of FIGURES 2 and 3, access to the power, telephone and signal wiring systems is available at a single access location. Furthermore, the present conduit means 50 cooperates with the opposed openings 48 (FIGURE 2) or the opening 63 (FIGURE 3) to accommodate availability of three types of electrical service at a single access location in the metal raceway sections 20, 20' for future electrical demands. Another consideration is that in either of the arrangements illustrated in FIGURES 2 and 3, the conductors traverse the various cells for only a relatively short distance and cannot and do not interfere with the wiring in the cell being traversed.

CONDUIT MEANS

Figure 4:
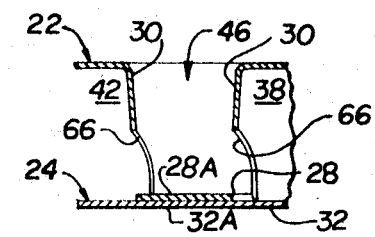
FIGURE 4 is a fragmentary cross-sectional view, similar to FIGURE 5, illustrating an intermediate valley prior to being deformed into conduit means of the present invention.

Referring to FIGURE 4 it will be seen that the intermediate valley 28 engages the web 32 to provide superposed sheet portions 28A and 32A. The present conduit means may be provided in either the upper metal sheet 22 or the lower metal sheet 24.

Figure 5:
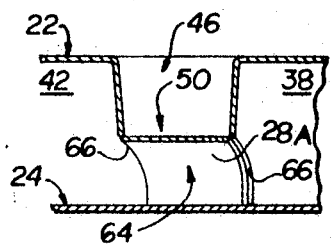
FIGURE 5 is a fragmentary cross-sectional view taken along the line V—V of FIGURE 1.

As shown in FIGURE 5, the conduit means 50 may comprise a convex indentation 64 formed in the upper metal sheet 22 after the sheet 22 has been corrugated. It will be appreciated that the convex indentation 64 may be formed in a variety of ways. The convex indentation 64 is, perhaps, most easily formed by first piercing generally semicircular openings 66, one in each of the confronting side walls 30, as best shown in FIGURE 4. Preferably, the openings 66 are pierced while the upper metal sheet 22 is in a flat condition, i.e., prior to being corrugated. The upper metal sheet 22 is then corrugated and thereafter, the sheet portion 28A is deformed upwardly into a semicircular configuration to form the convex indentation 64. The deformed sheet portion 28A is preferably disposed closely to the rim of each opening 66 thereby preventing ingress of the subsequently poured concrete. The lower metal sheet 24 is then secured to the upper metal sheet 22 to form the metal raceway section 20, 20'.

It is to be understood, at this time, that the convex indentation 64 may be formed in a variety of ways other than the manner described above and illustrated in FIGURES 4 and 5. It is only necessary that the convex indentation 64 provide communication between the intermediate cell 38 and either or both the first lateral cell 40 and the second lateral cell 42. The convex indentation 64 should have a cross-sectional area of sufficient size to accommodate the passage of conductors.

Figure 6:
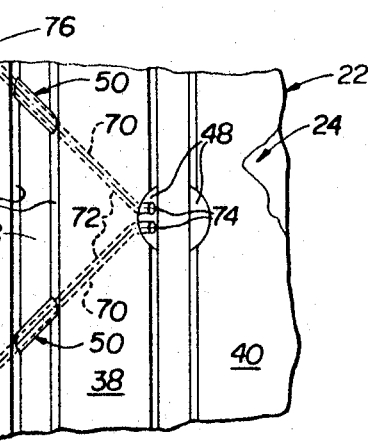
FIGURE 6 is a fragmentary plan view of the present flooring section.

Referring now in particular to FIGURE 6, a pair of the conduit means 50 is preferably provided for each pair of the opposed openings 48. Each of the conduit means 50 extends diagonally across the intermediate valley 28 between the intermediate cell 38 and the second lateral cell 42. The conduit means 50 are directed toward one of the openings 48 and diverge from the intermediate cell 38 away from each other toward the second lateral cell 42. The overall arrangement is such that the conduit means 50 provide entry into the second lateral cell 42 in opposite directions along the second lateral cell 42.

Figure 6A:
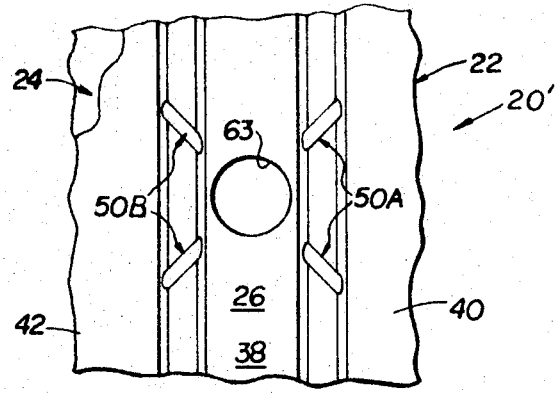
FIGURE 6A is a fragmentary plan view, similar to FIGURE 6, illustrating an alternative arrangement of the present conduit means.

In this connection it will be appreciated that in the metal raceway section 20', illustrated in FIGURE 6A, a pair of the first conduit means 50A and a pair of the second conduit means 50B may be provided for each opening 63. The overall arrangement is such that the pair of first conduit means 50A provide entry in opposite directions into the first lateral cell 40 while the pair of second conduit means 50B provide entry in opposite directions into the second lateral cell 42.

Figure 7:
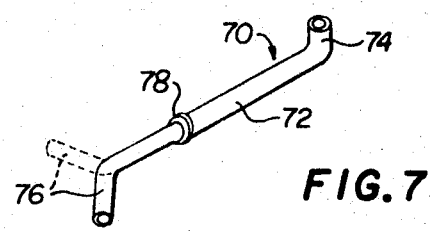
FIGURE 7 is an isometric view of a directional insert employed with the conduit means of the present invention.

Although it is possible to insert wiring through the conduit means 50 into the cell 42, it may be desirable to provide each of the conduit means 50 with a tubular member 70 which facilitates feeding wiring into the cell 42. As shown in FIGURES 6 and 7, the tubular member 70 includes a central section 72 having an upturned end 74 positioned in the region of the opening 48 and a laterally turned end 76 positioned within the cell 42. The laterally turned end 76 serves to direct wiring in a predetermined direction within the cell 42. The central section 72 may be provided with a flange 78 (FIGURE 7) positioned to abut the side wall 30 of the intermediate cell 38 when the laterally turned end 76 is disposed within the cell 42. The tubular member 70 is preferably formed from a flexible plastic material having good insulating properties. The flexible characteristic of the tubular member 70 facilitates inserting the laterally turned end 76 through the tunnel means 50.

Figure 8:
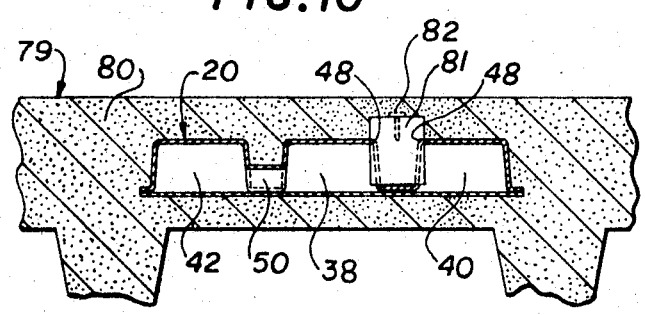

Referring now to FIGURE 8, there is illustrated a slab-type floor construction 79 formed from concrete 80, and having the metal raceway section 20 embedded therein. The metal raceway section 20 provides plural raceways 38, 40, 42 wherein communications between the interiors of the raceways 38, 42 is provided through the conduit means 50. The opposed openings 48 are closed preferably by means of a plug 81 which prevents ingress of concrete into the raceways 38, 40. A magnetically susceptible element 82, such as a nail, may be positioned at the center of the plug 81 to assist in locating the plug 81. Alternatively, the element 82 may comprise a magnet.

To gain access to the raceways 38, 40 a hole (not shown) is drilled through the concrete 80 directly over the plug 81. Positioning of the drill is facilitated by the element 82 in a manner well known in the art. The plug may then be removed to expose the openings 48 to gain access to the interiors of the cells 38, 40, 42.

Figure 9:
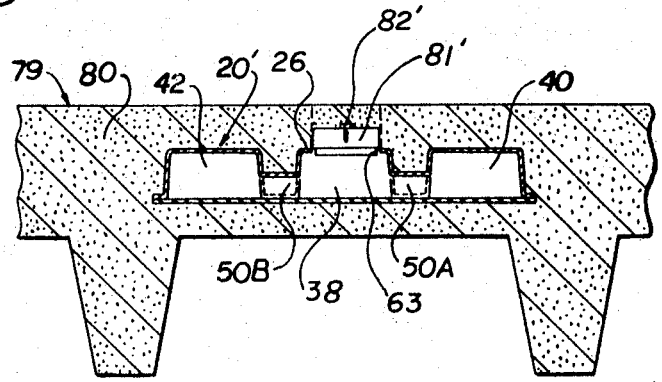
FIGURES 8 and 9 are cross-sectional views taken transversely through a slab-type floor construction incorporating the metal cellular sections of FIGURES 2 and 3.

Referring now to FIGURE 9, again there is illustrated the slab-type floor construction 79 formed from concrete 80, but wherein the metal raceway section 20' is embedded. The opening 63 in the crest 26 of the intermediate cell 38 is closed by a plug 81' having a magnetically susceptible element 82', such as a nail, positioned at the center of the plug 81'. Access may be gained to the interior of the cell 38 by drilling a hole (not shown) in the concrete 80 directly above the plug 81', as described above.

Alternative embodiments.—Alternative embodiments of the present conduit means will now be described with reference to FIGURES 10 and 11. Corresponding numerals will be employed to identify corresponding parts heretofore described.

Figure 10:
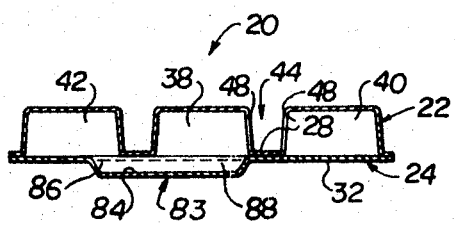
FIGURES 10 and 11 are fragmentary cross-sectional views illustrating further alternative embodiments of the present conduit means.

Referring now to FIGURE 10, the metal raceway section 20 is provided with conduit means 83 which comprises a concave indentation 84 formed in the lower metal sheet 24. In this embodiment, the concave indentation 84 terminates in a first end 86 communicating with the interior of the second lateral cell 42 and in a second end 88 disposed adjacent to the opening 48 in the intermediate cell 38.

The conduit means 83 is especially useful when used in conjunction with the opening 48 (see FIGURE 2). Since the conduit means 83 is positioned below the intermediate cell 38, the wiring passed through the conduit means 83 will not disturb the wiring extending through the intermediate cell 38. Again, the conduit means 83 preferably extends from the cell 42 diagonally across the cell 38 as in the case of conduit means 50 (FIGURE 6).

Figure 11:
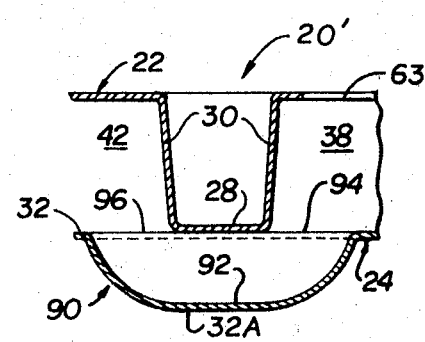

Referring now to FIGURE 11, the metal cellular raceway section 20' is provided with conduit means 90 providing communication between the interiors of the intermediate cell 38 and the second lateral cell 42. In this embodiment, the conduit means 90 comprises a concave indentation 92 formed in the superposed sheet portion 32A of the lower metal sheet 24 and having first and second ends 94, 96 communicating with the intermediate cell 38 and the second lateral cell 42, respectively. The conduit means 90 likewise extends diagonally between the cells 38, 42 as in the case of the conduit means 50 (FIGURE 1).

The conduit means 90 is especially useful when used in conjunction with opening 63 in the intermediate cell 38, that is, in the arrangement illustrated in FIGURES 3 and 6A. In this connection, it will be appreciated that additional conduit means 90 will be employed to provide communication between the first lateral cell 40 and the intermediate cell 38.

Although it is stated that the conduit means 83 and 90 are particularly useful when used in conjunction with openings 48 and 63, respectively, it should be apparent that the conduit means 83 and 90 could, with equal utility, be used in conjunction with the openings 63 and 48 respectively.

SUMMARY

From the foregoing description, it should be apparent that the present invention provides a metal raceway section having factory installed conduit means extending between adjacent cells to provide ready communication between said adjacent cells. The conduit means cooperate with openings formed in certain of the cells to accommodate availability of three types of electrical service at a single access location in the metal raceway section. It is also to be appreciated that the present invention provides means for conveying wiring from a remote cell to a single access location without disturbing the wiring in the adjacent cells and while conforming to existing electrical codes. The present invention also provides a method for making the present metal raceway section.

I claim as my invention:

1. In a metal raceway section comprising a corrugated upper metal sheet having crests and valleys and generally vertical side walls connecting adjacent ones of said crests and valleys, and a lower metal sheet secured to said corrugated sheet, said valleys having lower surfaces disposed in overall surface contact with said lower metal sheet, said lower metal sheet cooperating with said crests and said generally vertical side walls to form a pluarlity of spaced, generally parallel cells serving as electrical raceways, said cells having open ends, each pair of adjacent cells presenting spaced crests, confronting side walls and an intermediate valley disposed between said confronting side walls, the improvement comprising:

conduit means providing communication between the interiors of a said pair of adjacent cells, said conduit means extending between the confronting side walls of said pair of adjacent cells and residing entirely below said crests.

2. The improvement defined in claim 1 wherein said conduit means is formed in said upper metal sheet and resides entirely above said lower metal sheet.

3. The improvement defined in claim 1 wherein said conduit means comprises a convex indentation formed in the intermediate valley between said pair of adjacent cells and having open ends communicating with the interiors of said pair of adjacent cells through the said confronting side walls of said pair of adjacent cells.

4. The improvement defined in claim 1 wherein:
said lower metal sheet comprises a flat metal sheet; and wherein
said conduit means is formed in said lower metal sheet and resides entirely below said upper metal sheet.

5. The improvement defined in claim 4 wherein said conduit means comprises a concave indentation formed in said lower metal sheet, said concave indentation having an intermediate portion disposed below the said intermediate valley of said pair of adjacent cells and opposite ends communicating with the interiors of said pair of adjacent cells.

6. The improvement defined in claim 1 wherein said conduit means extends diagonally between said pair of adjacent cells.

7. The improvement defined in claim 6 including second conduit means spaced from the first said conduit means and extending diagonally between said pair of adjacent cells, the first said conduit means and said second conduit means diverging from each other and one cell of said pair of adjacent cells toward the other cell of said pair of adjacent cells to provide entry in opposite directions into said other cell.

8. In a metal raceway section comprising an upper corrugated metal sheet; a lower metal sheet secured to said corrugated upper metal sheet and cooperating therewith to provide at least intermediate and first and second lateral cells serving as electrical raceways for different electrical services; said corrugated upper metal sheet having valleys separating said cells; said valleys being in overall surface contact with said lower metal sheet; each of said cells including a crest and generally vertical side walls and having open ends; adjacent cells presenting confronting side walls; and access means providing communication to the interiors of said intermediate cell and said first lateral cell at one location in said metal raceway section; said access means comprising: the said confronting side walls of said intermediate and first lateral cells having at least two opposed openings, one formed in each of said confronting side walls; the improvement comprising:

conduit means providing communication between the interiors of said intermediate and second lateral cells, said conduit means residing below said crests and above said lower metal sheet and is directed toward said access means.

9. The improvement defined in claim 8 wherein said conduit means comprises a convex indentation formed in the valley separating said intermediate and second lateral cells and having open ends communicating with the interiors of said intermediate and second lateral cells through the confronting side walls thereof.

10. In a metal raceway section comprising an upper corrugated metal sheet; a lower metal sheet secured to said corrugated upper metal sheet and cooperating therewith to provide at least intermediate and first and second lateral cells serving as electrical raceways for different electrical services; said corrugated upper metal sheet having valleys separating said cells; said valleys being in overall surface contact with sad lower metal sheet; each of said cells including a crest and generally vertical side walls and having open ends; said intermediate and first lateral cells presenting a first pair of confronting side walls; said intermediate and second lateral cells presenting a second pair of confronting side walls; and the crest of said intermediate cell having at least one access opening providing communication to the interior of said intermediate cell at one location in said metal raceway section; the improvement comprising:

conduit means providing communication between the interiors of said intermediate and first lateral cells, said conduit means extending between said first pair of confronting side walls, resides below said crests and above said lower metal sheet and is directed toward said access opening.

11. The improvement defined in claim 10 including:
second conduit means providing communication between the interiors of said intermediate and second lateral cells, said second conduit means extending between said second pair of confronting side walls, resides below said crests and above said lower metal sheet and is directed toward said access opening.

12. The improvement defined in claim 11 wherein:
the first said conduit means comprises a first pair of convex indentations formed in the valley separating said first pair of confronting side walls and having open ends communicating with the interiors of said intermediate and first lateral cells through said first pair of confronting side walls, the convex indentations of said first pair diverging from each other and said access opening of said intermediate cell toward said first lateral cell thereby to provide entry in opposite directions into said intermediate cell in the region of said access opening; and wherein:
said second conduit means comprises a second pair of convex indentations formed in the valley separating said second pair of confronting side walls and having open ends communicating with the interiors of said intermediate and second cells through said second pair of confronting side walls, the convex indentations of said second pair diverging from each other and said access openings of said intermediate cell toward said second lateral cell thereby to provide entry in opposite directions into said intermediate cell in the region of said access opening.

References Cited
UNITED STATES PATENTS

| | | | |
|---|---|---|---|
| 640,176 | 1/1900 | Bremer | 52—220 X |
| 1,979,804 | 11/1934 | Lutz | 138—115 X |
| 2,313,135 | 3/1943 | Fay | 52—220 X |
| 2,377,557 | 6/1945 | Johnson. | |
| 2,783,639 | 3/1957 | Werner | 52—221 |

LARAMIE E. ASKIN, Primary Examiner

U.S. Cl. X.R.

29—157, 455; 52—221; 138—115; 174—49, 96